(12) United States Patent
Brady et al.

(10) Patent No.: US 10,764,274 B2
(45) Date of Patent: *Sep. 1, 2020

(54) PROXY-LESS SECURE SOCKETS LAYER (SSL) DATA INSPECTION

(71) Applicant: Sonicwall US Holdings Inc., Santa Clara, CA (US)

(72) Inventors: Justin M. Brady, Livermore, CA (US); Aleksandr Dubrovsky, San Mateo, CA (US); Boris Yanovsky, Saratoga, CA (US)

(73) Assignee: SONICWALL INC., Milpitas, CA (US)

( * ) Notice: Subject to any disclaimer, the term of this patent is extended or adjusted under 35 U.S.C. 154(b) by 195 days.

This patent is subject to a terminal disclaimer.

(21) Appl. No.: 15/685,768

(22) Filed: Aug. 24, 2017

(65) Prior Publication Data

US 2017/0374062 A1 Dec. 28, 2017

Related U.S. Application Data

(63) Continuation of application No. 12/497,328, filed on Jul. 2, 2009, now Pat. No. 9,769,149.

(51) Int. Cl.
*H04L 29/06* (2006.01)
*H04L 9/32* (2006.01)

(52) U.S. Cl.
CPC .......... *H04L 63/0823* (2013.01); *H04L 9/321* (2013.01); *H04L 9/3263* (2013.01); *H04L 63/0281* (2013.01); *H04L 63/0884* (2013.01); *H04L 63/1408* (2013.01); *H04L 63/166* (2013.01)

(58) Field of Classification Search
CPC . H04L 63/0281; H04L 63/08; H04L 63/0823; H04L 63/0884; H04L 63/1408; H04L 63/166; H04L 9/321; H04L 9/3263
See application file for complete search history.

(56) References Cited

U.S. PATENT DOCUMENTS

| | | |
|---|---|---|
| 5,796,942 A | 8/1998 | Esbensen |
| 5,945,933 A | 8/1999 | Kalkstein |
| 6,088,803 A | 7/2000 | Tso et al. |
| 6,108,782 A | 8/2000 | Fletcher et al. |
| 6,119,236 A | 9/2000 | Shipley |
| 6,178,448 B1 | 1/2001 | Gray et al. |
| 6,219,706 B1 | 4/2001 | Fan et al. |
| 6,449,723 B1 | 9/2002 | Elgressy et al. |

(Continued)

*Primary Examiner* — Linglan E Edwards
(74) *Attorney, Agent, or Firm* — Polsinelli LLP

(57) ABSTRACT

Some embodiments of proxy-less Secure Sockets Layer (SSL) data inspection have been presented. In one embodiment, a secured connection according to a secured network protocol between a client and a responder is setup via a gateway device, which is coupled between the client and the responder. The gateway device transparently intercepts data transmitted according to the secured network protocol between the client and the responder. Furthermore, the gateway device provides flow-control and retransmission of one or more data packets of the data without self-scheduling the packet retransmissions using timeouts and based on the packet retransmission logic of either the client-side or the responder side of the connection. The gateway device is further operable to perform security screening on the data.

20 Claims, 6 Drawing Sheets

(56) References Cited

U.S. PATENT DOCUMENTS

| | | |
|---|---|---|
| 6,851,061 B1 | 2/2005 | Holland et al. |
| 7,134,143 B2 | 11/2006 | Stellenberg et al. |
| 7,152,164 B1 | 12/2006 | Loukas |
| 7,185,368 B2 | 7/2007 | Copeland |
| 7,304,996 B1 | 12/2007 | Swenson et al. |
| 7,600,257 B2 | 10/2009 | Dubrovsky |
| 7,643,480 B2 * | 1/2010 | Liu ................. H04L 1/0002 370/228 |
| 7,698,453 B2 * | 4/2010 | Samuels ......... H04L 67/2876 709/234 |
| 7,809,386 B2 | 10/2010 | Stirbu |
| 7,835,361 B1 | 11/2010 | Dubrovsky |
| 7,839,859 B2 | 11/2010 | Kim et al. |
| 7,849,502 B1 | 12/2010 | Bloch et al. |
| 8,130,747 B2 | 3/2012 | Li et al. |
| 8,244,855 B1 * | 8/2012 | Walsh ............... H04L 43/028 709/224 |
| 9,769,149 B1 | 9/2017 | Brady |
| 2002/0083331 A1 | 6/2002 | Krumel |
| 2003/0065800 A1 | 4/2003 | Wyschogrod et al. |
| 2003/0084328 A1 | 5/2003 | Tarquini et al. |
| 2003/0110208 A1 | 6/2003 | Wyschogrod et al. |
| 2003/0145228 A1 | 7/2003 | Suuronen et al. |
| 2003/0154399 A1 | 8/2003 | Zuk et al. |
| 2004/0093513 A1 | 5/2004 | Cantrell et al. |
| 2004/0123155 A1 | 6/2004 | Etoh et al. |
| 2004/0199790 A1 | 10/2004 | Lingafelt et al. |
| 2004/0255163 A1 | 12/2004 | Swimmer et al. |
| 2005/0021999 A1 * | 1/2005 | Touitou ............. H04L 69/163 726/11 |
| 2005/0050362 A1 * | 3/2005 | Peles ................. H04L 63/02 726/4 |
| 2005/0108411 A1 | 5/2005 | Kliland et al. |
| 2005/0120243 A1 | 6/2005 | Palmer et al. |
| 2005/0135380 A1 | 6/2005 | Sahita et al. |
| 2005/0187916 A1 | 8/2005 | Levin et al. |
| 2005/0216770 A1 | 9/2005 | Rowett et al. |
| 2005/0262556 A1 | 11/2005 | Waisman et al. |
| 2006/0020595 A1 | 1/2006 | Norton et al. |
| 2006/0069787 A1 | 3/2006 | Sinclair |
| 2006/0077979 A1 | 4/2006 | Dubrovsky |
| 2006/0272014 A1 * | 11/2006 | McRae ............ H04L 63/1416 726/12 |
| 2007/0058551 A1 | 3/2007 | Brusotti et al. |
| 2008/0034073 A1 | 2/2008 | McCloy et al. |
| 2008/0126794 A1 * | 5/2008 | Wang ............... H04L 63/0464 713/151 |
| 2008/0178278 A1 * | 7/2008 | Grinstein ......... H04L 63/0227 726/12 |
| 2008/0235755 A1 | 9/2008 | Blaisdell et al. |
| 2009/0201813 A1 * | 8/2009 | Speight .............. H04W 80/06 370/235 |
| 2009/0271613 A1 | 10/2009 | Brabson |
| 2012/0131330 A1 | 5/2012 | Tonsing et al. |

* cited by examiner

PROXY-LESS SECURE SOCKETS LAYER (SSL) DATA INSPECTION

CROSS REFERENCE TO RELATED APPLICATIONS

The application is a continuation and claims the priority benefit of U.S. patent application Ser. No. 12/497,328 filed Jul. 2, 2009, now U.S. Pat. No. 9,769,149, the disclosure of which is incorporated herein by reference

TECHNICAL FIELD

The present invention relates to intrusion detection and prevention in a networked system, and more particularly, to providing proxy-less data inspection.

BACKGROUND

FIG. 1 illustrates a current networked system 100. Conventionally, to make a secure connection between the client 110 and a server 120, the following operations are performed. A web browser on the client is configured to point to a proxy Internet Protocol (IP) address for Hypertext Transfer Protocol Secured (HTTPS) connections. An initial CONNECT request with full Universal Resource Locator (URL) is sent by the client 110 to a proxy 130 between the client 110 and the server 120. The proxy 130 connects to the HTTPS server 120 using the full URL provided in the client's 110 request. The HTTPS server 120 sends back a certificate. The proxy 130 strips out relevant information from the certificate (e.g., common name, etc.) and creates a new certificate signed by a certification-authority certificate, which the user of the proxy 130, i.e., the client 110, has indicated to trust. Eventually, the newly generated certificate is passed to the client 110 and the client 110 accepts the certificate.

Data is decrypted on one connection, and clear-text (i.e., decrypted data) is inspected. Then the data is re-encrypted when sent on another connection. As a result, two TCP/SSL connections 115 and 125 are established, namely, a first connection 125 between the proxy 130 and the server 120, and a second connection 115 between the client 110 and the proxy 130, where each connection supports full Transmission Control Protocol (TCP) flow-control logic. Packet loss re-transmissions are handled individually for each connection and all retransmission scheduling is done on the proxy 130.

One disadvantage of the above scheme is that the client's 110 browser has to be configured with the proxy's IP address. The above scheme is not so scalable due to full TCP based flow control implemented on the inspecting device and due to the fact that sockets do not scale well for large number of connections. Furthermore, it is difficult to configure for non-HTTP protocols.

BRIEF DESCRIPTION OF THE DRAWINGS

The present invention is illustrated by way of example, and not by way of limitation, in the figures of the accompanying drawings and in which.

DETAILED DESCRIPTION

Figure 1:
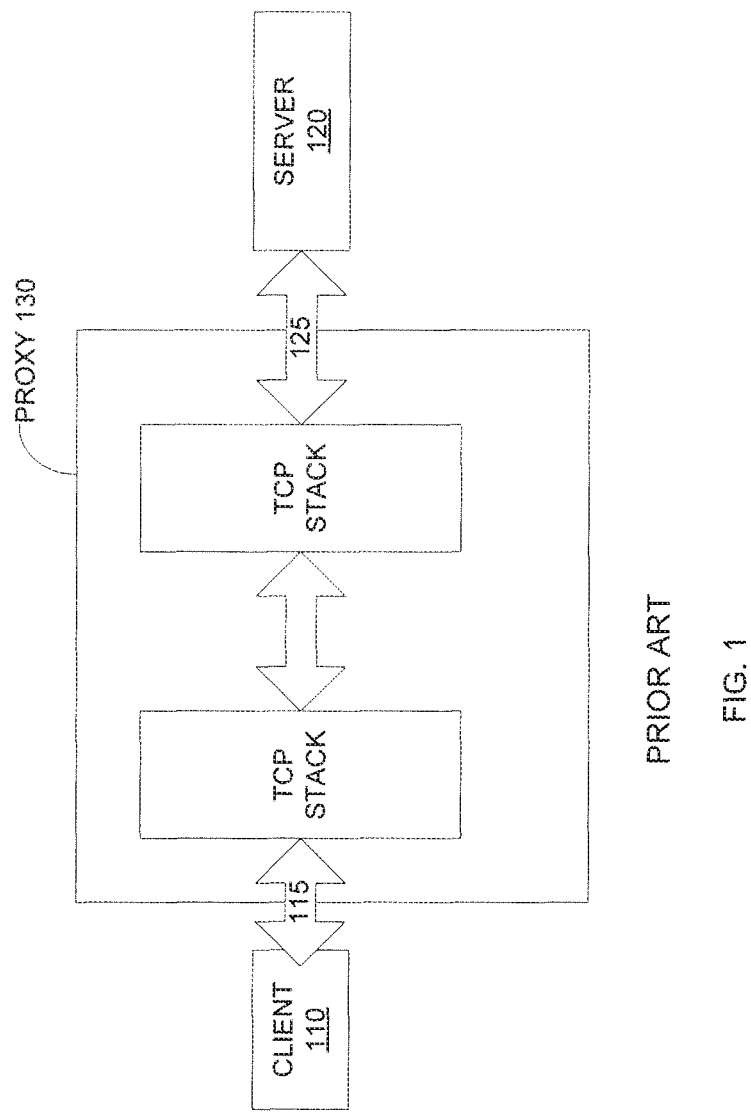
FIG. 1 illustrates a conventional networked system with a proxy.

Described herein are some embodiments of proxy-less Secured Sockets Layer (SSL) data inspection. In one embodiment, a TCP connection is established between a client (a.k.a. the initiator) and a HTTPS server (a.k.a. the responder). The client's web browser (or any network access application) issues a connection request, e.g., SSL Hello, to the server. A proxy-less SSL inspection appliance, such as a gateway device, intercepts the Hello request and sends an identical copy to the server. In response, the server sends a certificate to the proxy-less SSL inspection appliance. The proxy-less SSL inspection appliance strips out relevant information from the certificate (e.g., common name, etc.) and creates a new certificate signed by a certification-authority certificate, which the client has indicated to trust. The newly generated certificate is passed from the proxy-less SSL inspection appliance to the client. The client accepts the newly generated certificate because this certificate is signed by the certification-authority certificate. Packets received by the proxy-less SSL inspection appliance are decrypted and inspected by the proxy-less SSL inspection appliance using various mechanisms, such as deep packet inspection (DPI), content filtering, etc. After inspection, the proxy-less SSL inspection appliance re-encrypts the packets and forwards the packets to the client if there is no security issue with passing the packets. If potential malware or forbidden content is found in the packets, then the proxy-less SSL inspection appliance may block the packets from the client. The proxy-less SSL inspection appliance may further send a message to warn the client of its finding.

In the above scheme, TCP re-transmission logic is event driven based on retransmissions from server side and client side, rather than being scheduled by a TCP stack on each side of the TCP connection. In other words, the proxy-less SSL inspection appliance provides flow-control and retransmission of data packets without self-scheduling the packet retransmission using timeouts, but rather, based on the packet retransmission logic of either the client-side or server-side of the connection. As a result, security inspection of clear-text can take place at the proxy-less SSL inspection appliance without using a full TCP-based proxy.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMS), EPROMs, EEPROMs, flash memory, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 2:
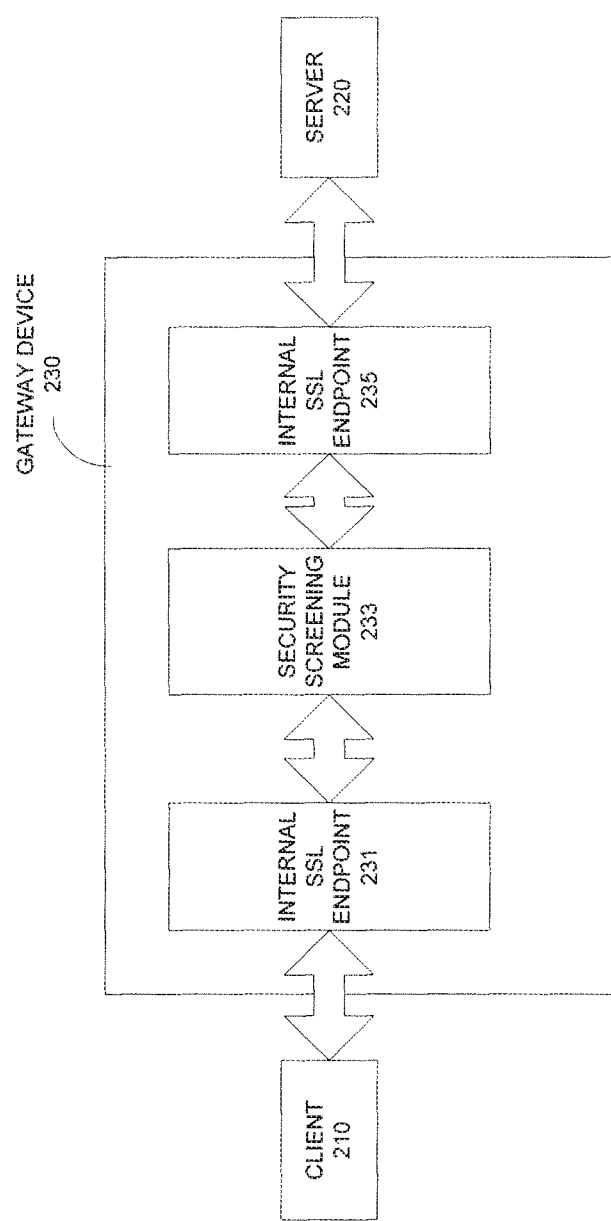
FIG. 2 illustrates one embodiment of a proxy-less system.

FIG. 2 illustrates one embodiment of a proxy-less system. The proxy-less system 200 includes a client 210, a server 220, and a gateway device 230 coupled between the client 210 and the server 220. When the client 210 initiates a connection with the server 220, the client 210 may be referred to as an initiator and the server 220 may be referred to as a responder, and vice versa. The client 210 and the server 220 may be implemented using various computing devices, such as personal computers, laptop computers, personal digital assistants (PDAs), cellular telephones, Smartphones, etc. The gateway device 230 may also be implemented using various computing devices, such as those listed above. In some embodiments, the gateway device 230 is implemented as a set-top box coupled to the client 210 locally. The gateway device 230 acts as a "middleman" device between the client 210 and the server 220.

In some embodiments, the gateway device 230 may intercept a client connection request from the initiator, say the client 210, before it reaches the intended endpoint, say the server 220, and generate IP TCP packets as replies as if they were originated from that endpoint, and to do the same for communication with the original responder endpoint. Separate TCP state is kept for communication with the initiator and responder endpoints at the gateway device 230. This state contains data allowing the gateway device 230 to do flow-control and retransmission. For example, the state may include a sequence number of the last packet received, which may be used in determining if the next packet is dropped or lost. In order to increase scalability and to simplify the gateway device 230, TCP retransmission to a receiver may only be done when a retransmit from the sender is seen in some embodiments. Data from one side is not acknowledged until it is acknowledged by the opposite endpoint.

During connection setup, the TCP handshake is allowed to complete between the two hosts, but once the client attempts to send data to negotiate a secured connection (e.g., SSL), the request is passed to an internal secured endpoint (such as the internal secured endpoint 231 or 235 in FIG. 2) on the gateway device 230. Before this endpoint continues negotiation, the gateway device 230 may first initiate a secured client connection to the responder endpoint, store the responder certificate details, and complete the key exchange.

Afterwards, secured connection certificate and/or key exchange and negotiation is completed with the initiator, optionally using a certificate dynamically generated with details from the responder certificate as discussed below. Because the gateway device 230 chooses the public keys and does the negotiation to terminate the SSL connection, it is possible for the gateway device 230 to inspect the clear text data sent by both sides. Once both connections are established, decrypted clear text data is transferred from one connection to the other as follows.

In some embodiments, the data received by the gateway device 230 from the initiator may be encrypted and sent over the responder secured connection, and vice versa. In this way, it is possible to view and/or modify the clear text data sent from one endpoint to the other. No configuration on either end (i.e., the client 210 and the server 220) is necessary because the gateway device 230 which sits on the path between the two sides can detect when to attempt secured decrypting and/or re-encrypting by detecting a connection to a known SSL TCP port, or by detecting a presence of a valid SSL Hello packet to any port. As opposed to a conventional explicit third party SSL proxy, where the connecting client must be aware of the forwarding proxy relationship and contact the proxy SSL endpoint directly, both sides' TCP and SSL states appear to be communicating with their original endpoints, so this interception is transparent to both sides.

As discussed above, the gateway device 230 may dynamically generate a certificate in the process of establishing a secured connection between the client 210 and the server 220. In some embodiments, the client 210 may use RSA encryption to verify a certificate delivered by the server 220 is "signed" by a third party authority that has previously been trusted by the client 210. For instance, the client 210 may have previously accepted a certification-authority (CA) certificate from this third party. When the gateway device 230 intercepts the secured connection and responds using its own internal secured endpoint 235, it is necessary to deliver a certificate containing a public key that the gateway device 230 has the private key for, so that key exchange is possible. The certificate also contains attributes to identify the endpoint to the client 210. In general, the client 210 may verify these attributes before continuing to negotiate further. If the attributes do not all match what is expected, the client 210 may warn the user before continuing. In order to appear legitimate, the certificate details from the responder certificate from the server 220 are stored by the gateway device 230 and a new certificate is generated that appears substantially identical, except for the public key. The newly generated certificate is then signed by the CA certificate, which the client 210 has previously trusted. In this way, all checks done by the client 210 on the certificate may pass, and the client may complete the connection and begin sending data to the server 220 via the gateway device 230.

Figure 3:
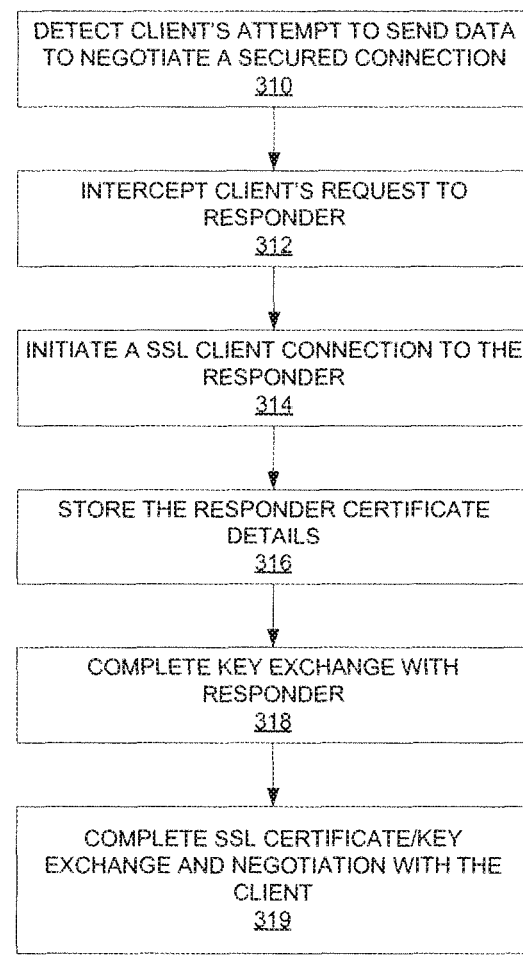
FIG. 3 illustrates one embodiment of a method to establish a secured connection between a client and a responder without a proxy.

FIG. 3 illustrates one embodiment of a method to establish a secured connection between a client and a responder without a proxy. The method may be performed by processing logic that may comprise hardware (e.g., circuitry, dedicated logic, programmable logic, processing cores, etc.), software (such as instructions run on a processing core), firmware, or a combination thereof.

Initially, processing logic detects a client's attempt to send data to negotiate a secured connection with a responder (processing block 310). For example, the secured connection may be SSL. Then processing logic intercepts the client's request to responder (processing block 312). Processing logic initiates a secured client connection to the responder (processing block 314). In response, the responder may send a certificate to processing logic. Processing logic stores the responder's certificate details (processing block 316). Then processing logic completes key exchange with the responder (processing block 318). Finally, processing logic completes secured connection certificate and/or key exchange and negotiation with the client (processing block 319). To complete secured connection certificate and/or key exchange and negotiation with the client, processing logic may dynamically generate a new certificate to send to the client.

Figure 4:
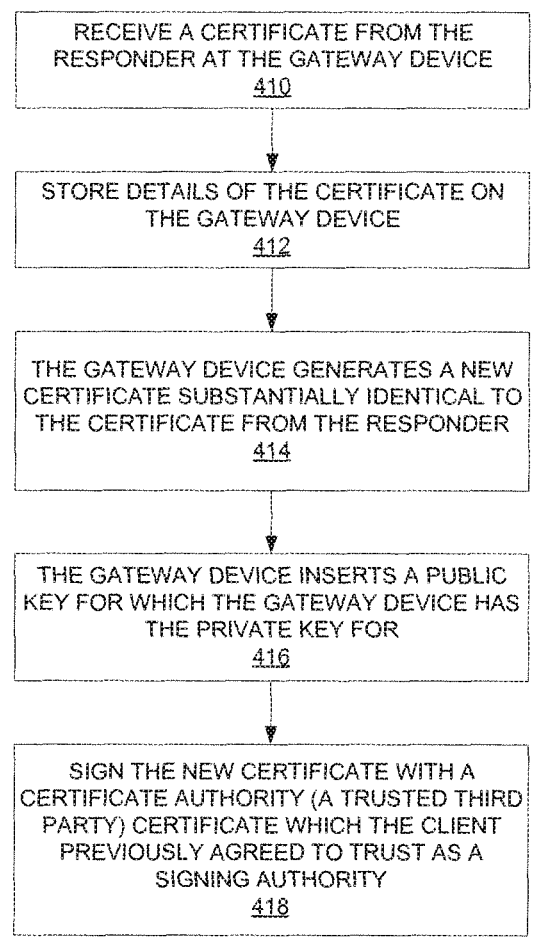
FIG. 4 illustrates one embodiment of a method to dynamically generate a certificate.

FIG. 4 illustrates one embodiment of a method to dynamically generate a certificate. The method may be performed by processing logic that may comprise hardware (e.g., circuitry, dedicated logic, programmable logic, processing cores, etc.), software (such as instructions run on a processing core), firmware, or a combination thereof.

Initially, processing logic receives a certificate from the responder at a gateway device (processing block 410). Then processing logic stores details of the certificate, such as common name, on the gateway device (processing block 412). Processing logic generates a new certificate substantially identical to the certificate from the responder at the gateway device (processing block 414). Processing logic inserts a public key into the certificate at the gateway device, where the gateway device has the private key for the public key (processing block 416). In some embodiments, the public key is pre-generated at the gateway device along with its private key pair. Finally, processing logic signs the new certificate with a certificate authority (usually a trusted third party) certificate, which the client has previously agreed to trust as a signing authority (processing block 418). Note that the same public key may be inserted into all new certificates subsequently generated at the gateway device for the current connection.

Figure 5:
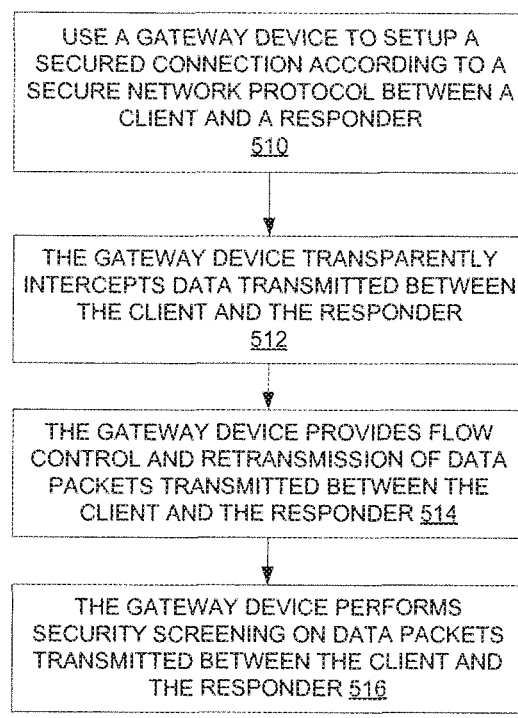
FIG. 5 illustrates one embodiment of a method to perform proxy-less data inspection.

FIG. 5 illustrates one embodiment of a method to perform proxy-less data inspection. The method may be performed by processing logic that may comprise hardware (e.g., circuitry, dedicated logic, programmable logic, processing cores, etc.), software (such as instructions run on a processing core), firmware, or a combination thereof.

Initially, processing logic uses a gateway device (such as the gateway device 230 shown in FIG. 2) to set up a secured connection according to a secure network protocol (e.g., SSL) between a client and a responder (processing block 510). Details of some embodiments of the secured connection setup have been discussed in details above. Then processing logic uses the gateway device to transparently intercept data transmitted between the client and the responder (processing block 512). Processing logic further uses the gateway device to provide flow control and retransmission of data packets transmitted between the client and the responder (processing block 514). The flow control and retransmission of data may be provided without self-scheduling the packet retransmission using timeouts at the gateway device, but rather, based on the packet retransmission logic of either the client-side or the responder-side of the connection. Using the gateway device, processing logic performs security screening on data packets transmitted between the client and the responder (processing block 516). The security screening may include content filtering, deep packet inspection, etc.

Figure 6:
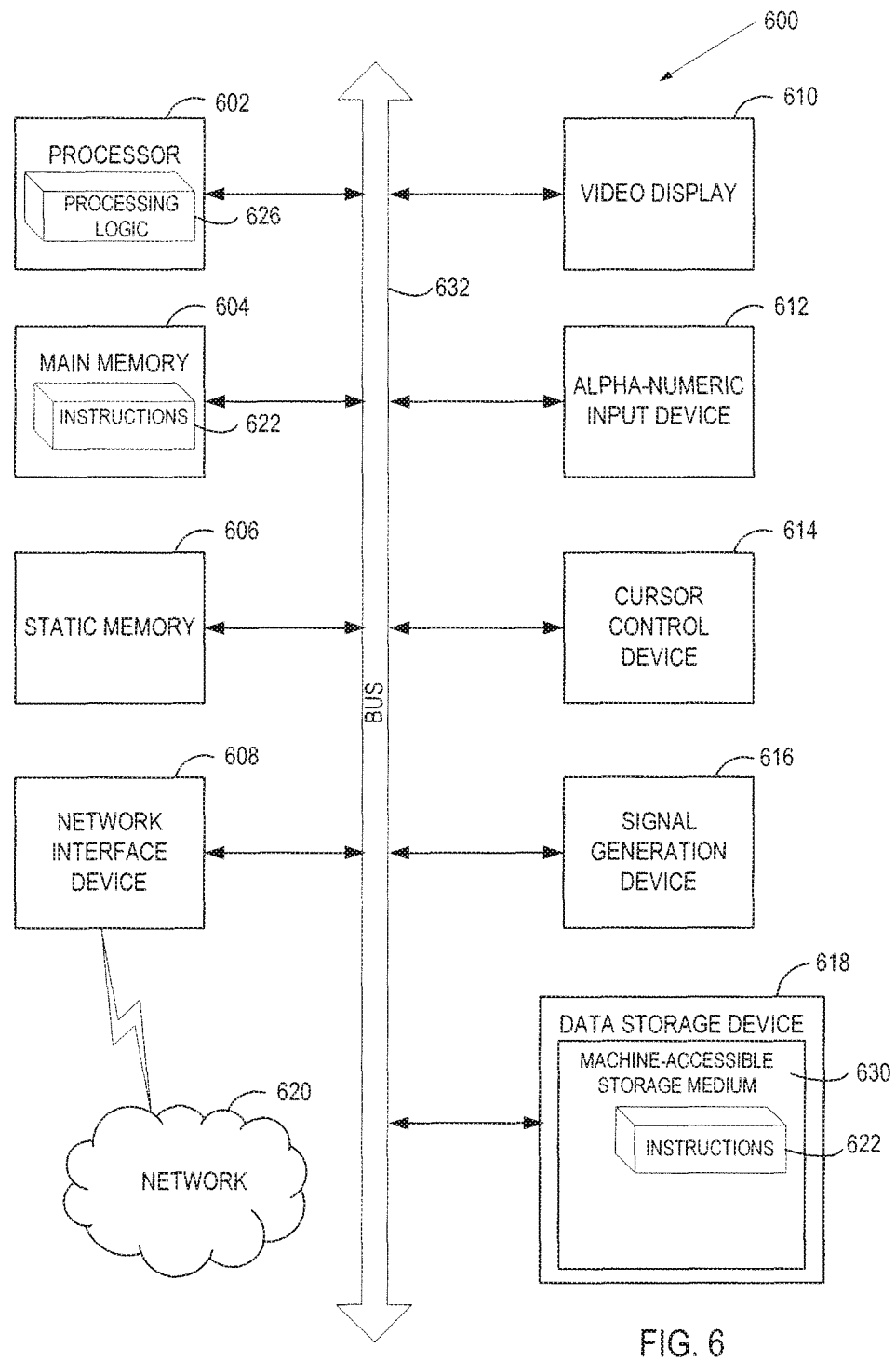
FIG. 6 illustrates a block diagram of an exemplary computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 632.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 518 may include a machine-accessible storage medium 630 (also known as a machine-readable storage medium or a computer-readable medium) on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

While the machine-accessible storage medium 630 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc. In some embodiments, machine-accessible storage medium may also be referred to as computer-readable storage medium.

Thus, some embodiments of cloud-based gateway antivirus scanning have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for inspecting data sent over a computer network, the method comprising:
    establishing a secure connection between a client device and a responder device via a gateway;
    intercepting a plurality of data packets sent between the responder device and the client device via the secure connection;
    maintaining packet state information relating to the intercepted data packets at the gateway, wherein a first set of state information pertains to a first set of the intercepted packets from communications with the responder device, and wherein a second set of state information pertains to a second set of the intercepted packets from communications with the client device;
    updating the first set of state information as each of the first set of intercepted packets are inspected and communicated to the responder device;
    transmitting a current intercepted packet from the gateway via the secured connection to the client device, wherein the client device identifies the current packet as being sent directly from the responder device;
    receiving a retransmission of the current packet from the responder device based on the responder device not receiving an acknowledgment from the client device;
    transparently passing the acknowledgement to the responder device that was received from the client device;
    updating the second set of state information as each of the second set of intercepted packets are inspected and communicated to the client device;
    identifying that the packets from the responder device include data that is associated with a security function; and
    executing the security function based on the identification that the data is associated with the security function.

2. The method of claim 1, further comprising:
    receiving a first certificate from the responder device;
    generating a second certificate based on modifying the first certificate, wherein a public key of the second certificate is different from a public key of the first certificate and a remaining portion of the second certificate is identical to a remaining portion of the first certificate; and
    establishing a new secured connection based on the second certificate.

3. The method of claim 2, wherein establishing the new secured connection includes:
    storing details of the first certificate in memory;
    completing key exchange with the responder device; and
    completing certificate and key exchange with the client device.

4. The method of claim 1, wherein executing the security function comprises blocking further transmission of the data packets sent to the client device.

5. The method of claim 1, wherein executing the security function comprises sending a warning message to the client device.

6. The method of claim 1, wherein inspecting the intercepted data packets includes deep packet inspection.

7. The method of claim 1, wherein executing the security function comprises filtering content of the intercepted data packets.

8. The method of claim 1, wherein the current packet is encrypted, and further comprising determining when to attempt decryption of the encrypted packet.

9. The method of claim 8, wherein determining when to attempt decryption of the encrypted packet is based on detection of a connection to a known port.

10. The method of claim 8, wherein when to attempt decryption of the encrypted packet is based on detection of a valid secure socket layer (SSL) Hello packet.

11. The method of claim 8, further comprising determining when to attempt re-encryption of the decrypted packet.

12. A non-transitory computer-readable storage medium having embodied thereon a program executable by a processor for implementing a method for inspecting data sent over a computer network, the method comprising:
    establishing a secure connection between a client device and a responder device via a gateway;
    intercepting a plurality of data packets sent between the responder device and the client device via the secure connection;
    maintaining packet state information relating to the intercepted data packets at the gateway, wherein a first set of state information pertains to a first set of the intercepted packets from communications with the responder device and a second set of state information pertains to a second set of the intercepted packets from communications with the client device;
    updating the first set of state information as each of the first set of intercepted packets are inspected and communicated to the responder device;
    transmitting a current intercepted packet from the gateway via the secured connection to the client device, wherein the client device identifies the current packet as being sent directly from the responder device;

receiving a retransmission of the current packet from the responder device based on the responder device not receiving an acknowledgment from the client device;

transparently passing the acknowledgement to the responder device that was received from the client device;

updating the second set of state information is as each of the second set of intercepted packets are inspected and communicated to the client device;

identifying that the packets from the responder device include data that is associated with a security function; and executing the security function based on the identification that the data is associated with the security function.

13. The non-transitory computer-readable storage medium of claim 12, further comprising instructions executable to:

receive a first certificate from the responder device;

generate a second certificate based on modifying the first certificate, wherein a public key of the second certificate is different from a public key of the first certificate and a remaining portion of the second certificate is identical to a remaining portion of the first certificate; and establish a new secured connection based on the second certificate.

14. The non-transitory computer-readable storage medium of claim 13, wherein establishing the secured connection includes:

storing details of the first certificate in memory;

completing key exchange with the responder device; and completing certificate and key exchange with the client device.

15. The non-transitory computer-readable storage medium of claim 12, wherein executing the security function comprising blocking further transmission of the data packets sent to the client device.

16. The non-transitory computer-readable storage medium of claim 12, wherein executing the security function comprises sending a warning message to the client device.

17. The non-transitory computer-readable storage medium of claim 12, wherein inspecting the intercepted data packets includes deep packet inspection.

18. The non-transitory computer-readable storage medium of claim 12, wherein executing the security function comprises filtering content of the intercepted data packets.

19. A gateway apparatus for inspecting data sent over a computer network, the apparatus comprising:

a communication interface that:

establishes a secure connection between a client device and a responder device via a gateway, and receives a plurality of data packets sent between the responder device and the client device via the secure connection, wherein the plurality of data packets sent between the responder device and the client device via the secure connection are intercepted;

a memory; and a processor that executes instructions out of the memory to:

maintain packet state information relating to the intercepted data packets at the gateway that includes a first set of state information that pertains to a first set of the intercepted packets from communications with the responder device and a second set of state information that pertains to a second set of the intercepted packets from communications with the client device, update the first set of state information as each of the first set of intercepted packets are inspected and communicated in relation to the responder device, wherein the communication interface further:

transmits a current intercepted packet from the gateway via the secured connection to the client device, wherein the client device identifies the current packet as being sent directly from the responder device, and receives a retransmission from the responder device based on the responder device not receiving an acknowledgment from the client device;

allow the acknowledgement received from the client device to be passed to the responder device transparently;

update the second set of state information as each of the second set of intercepted packets are inspected and communicated to the client device, identify that the packets from the responder device include data that is associated with a security function, and execute the security function based on the identification that the data is associated with the security function.

20. The apparatus of claim 19, wherein:

the processor executes further instructions to generate a second certificate by modifying a first certificate, the generation of the second certificate causing:

the second certificate to include a public key of the second certificate that is different from a public key of the first certificate, and a remaining portion of the second certificate to be identical to a remaining portion of the first certificate, and the communication interface establishes a new secured connection based on the second certificate.

\* \* \* \* \*